Jan. 25, 1938.　　　G. H. HUFFERD　　　2,106,567
JOINT AND METHOD OF MAKING THE SAME
Filed Feb. 18, 1935
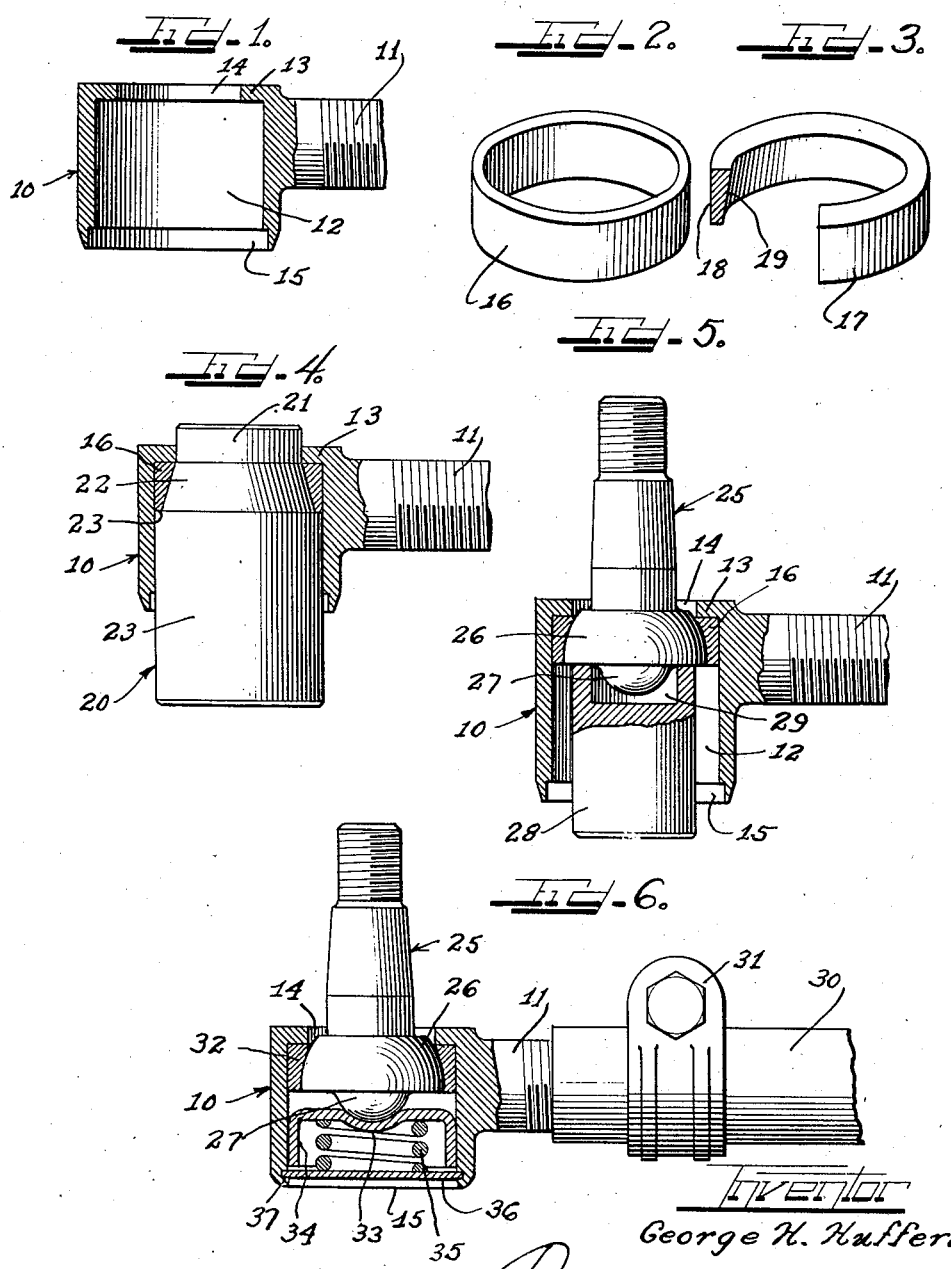

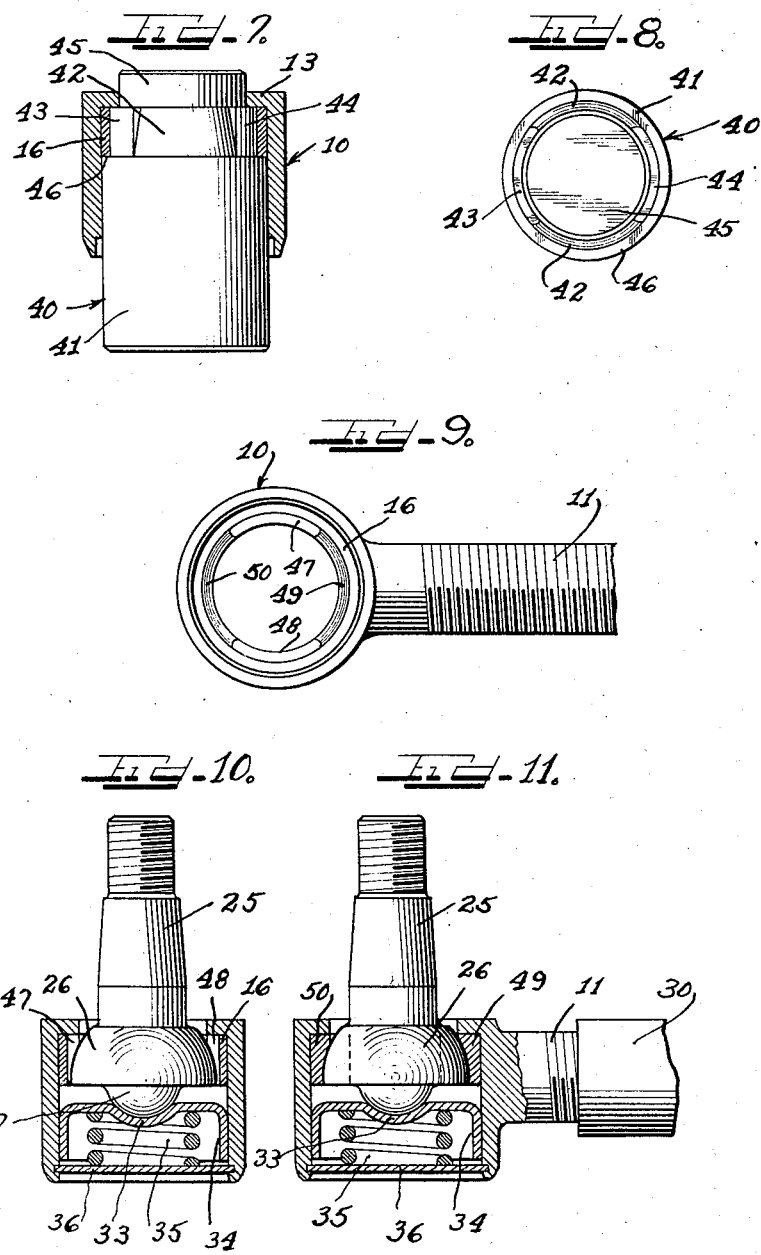

Patented Jan. 25, 1938

2,106,567

UNITED STATES PATENT OFFICE 2,106,567

JOINT AND METHOD OF MAKING THE SAME

George H. Hufferd, Detroit, Mich., assignor to Thompson Products Incorporated, Detroit, Mich., a corporation of Ohio Application February 18, 1935, Serial No. 7,013

15 Claims. (Cl. 29—152)

This invention relates to joints having stud members in bearing relation with soft metal bearing surfaces encased in the joint housing. The invention includes a process for making joints of this construction.

More specifically, this invention relates to tie rod joints having stud members pressed into seating engagement with Babbitt metal bearing sleeves which are encased in the joint socket.

The invention includes a process of making tie rod joints wherein annular rings of Babbitt metal are pressed into socket members and the stud members are then pressed into proper seating relation with the encased Babbitt rings.

Heretofore tie rod joints have been formed with seating members of steel or other hard bearing metals that had to be properly ground or shaped into true bearing relationship with the head of a stud member. According to the present invention, all grinding, lapping and other expensive finishing operations are dispensed with by forming the seating member of a soft metal which can be readily pressed into the desired size and shape to form a true bearing seat for the head of a stud member.

The present invention utilizes the rough forgings or castings commonly used as socket members for tie rod joints as the housing member for the joints of this invention. Annular rings of soft bearing metal such as Babbitt metal are used to form the seating element of the joint. A ring of this type is inserted in the housing and die pressed and expanded into a secure frictional engagement therewith. The stud member is then pressed into the seated ring so that the head of the stud member forms its own bearing surface in the ring by flowing the soft metal around the head during a simple pressing operation. The joint is thus prepared without separate grinding or lapping operations heretofore necessary in preparing joints of this type, and a true bearing relation is always insured between the stud and the seating member since the stud is pressed into the seating member and must necessarily form a seat therein of the proper size and shape to afford a true bearing surface.

It is therefore an object of this invention to provide a tie rod joint having a soft bearing metal ring pressed into the socket member thereof to form a self-seat forming bearing for the head of a stud member.

Another object of this invention is to provide a process for making tie rod joints which dispenses with all lapping and grinding operations heretofore necessary for the seating of the stud element of the joint in proper bearing relation with the housing member of the joint.

Another object of this invention is to provide a tie rod joint having a soft bearing metal seating element instead of the usual steel seating element.

A further object of this invention is to provide a process for forming joints wherein a stud member is pressed into true bearing relationship in a socket member without the aid of lapping, grinding or other finishing operation.

A further object of this invention is to provide a process for making joints by die pressing the constituent elements of the joints into proper position and bearing relationship with each other.

Other and further objects of this invention will become apparent from the following detail description of the annexed sheets of drawings which form a part of this specification.

On the drawings:

Figure 1 is a central cross-sectional view of a housing member or female member of a tie rod joint such as is used to form the socket member of the joint of this invention.

Figure 2 is an isometric view of a soft bearing metal ring used to form the seating element.

Figure 3 is a broken isometric view of an alternative form of soft bearing metal ring used to form the seating member of the joint of this invention.

Figure 4 is a central cross-sectional view, with parts in elevation, of the housing member shown in Figure 1, illustrating the manner in which the soft bearing metal ring is pressed into integral relationship with the housing member.

Figure 5 is a cross-sectional view, with parts in elevation, illustrating the manner in which the stud element is pressed into bearing relation with the seated bearing ring.

Figure 6 is a cross-sectional view, with parts in elevation, illustrating a finished joint of this invention.

Figure 7 is a cross-sectional view of a joint housing having a bearing ring pressed therein and showing in elevation an alternative form of a die press for forming localized bearing portions in the soft metal ring on opposite sides of a plane containing the axis of the stud member.

Figure 8 is a top plan view of the housing and die shown in Figure 7.

Figure 9 is a bottom plan view of the housing shown in Figure 7, illustrating the localized bearing portions formed in the soft metal seating ring.

Figure 10 is a front elevational view of the joint assembly showing the joint housing in cross-section to illustrate the localized bearing surfaces in the soft metal bearing ring.

Figure 11 is a side elevational view of the joint assembly illustrated in Figure 10 with the housing in cross-section.

As shown on the drawings:

In Figure 1 the reference numeral 10 indicates generally a housing for a joint of this invention having a laterally extending shank portion 11, a central bore 12, an annular integral flange 13 at the top of the housing defining a circular opening 14 of smaller diameter than the bore 12, and an annular groove 15 at the bottom thereof.

A ring or sleeve 16 having an outside diameter adapted to fit within the bore 12 is formed of Babbitt or other soft bearing metal. As indicated in Figure 2, this ring 16 may have parallel inside and outside faces, or as shown in Figure 3, a ring or sleeve 17 may be used having a cylindrical outside face 18 and a tapered or conical inner face 19.

In accordance with the process of this invention, a soft bearing metal ring such as 16 or 17 is inserted in the housing 10 in the bore 12 thereof in abutting relation with the annular flange 13. As indicated in Figure 4, a die 20 having a guide portion 21 adapted to fit through the opening 14 of the housing 10 and a frusto-conical tapered portion 22 below the guide 21 is inserted in the housing 10 to shape and expand the soft metal bearing sleeve 16 into tight frictional engagement with the housing wall to securely seat the ring therein. The frusto-conical portion 22 of the die also provides the inner face of the ring 16 with a tapered surface. Since the ring 16 is formed of a soft workable metal, it is readily pressed into the desired position and shape. Excess metal is forced out of the housing through the opening 14. It is desirable to form the ring 16 or 17 of more material than is used in the shaped seating element and to force the excess metal out of the joint housing during the pressing operation. The die 20 is provided with a main shank portion 23 adapted to snugly engage the walls of the housing 10 and of larger diameter than the largest diameter of the frusto-conical portion 22 so as to form a shoulder 23 at the base of the frusto-conical portion 22 for engaging the bottom of the ring 16.

When the die 20 is forced into the joint housing 10, the sleeve 16 is forced upwardly against the flange 13 of the housing by the shoulder 23 of the die. The frusto-conical portion 22 of the die also expands the sleeve 16 into tight engagement with the side walls of the housing and at the same time forms a frusto-conical inner surface on the sleeve. Excess metal is squirted through the opening 14 in the housing, since the portion 21 of the die does not tightly engage with the walls defining the opening.

After the ring 16 has been seated in the housing 10 by the die pressing operation illustrated in Figure 4, the die 20 is removed and a stud member 25 having a semi-spherical head portion 26 and a rounded end 27 beneath the head portion 26 is inserted in the bore 12 of the housing 10. The head 26 of the stud member 25 engages with the tapered inner surface of the ring 16 which has been pressed in the housing. A plunger 28 having a well 29 adapted to receive the rounded end 27 of the stud member 25 is forced against the bottom of the head portion 26 of the stud to press the head portion 26 into a full seating engagement with the bearing ring 16. In this manner the semi-spherical head portion 26 of the stud forms its own seat in the bearing ring 16 and a true bearing fit is assured.

The pressing operations illustrated in Figures 4 and 5 are carried out at pressures dependent upon the shape and hardness of the bearing ring 16. If a bearing ring of the shape shown in Figure 2 and formed of high lead content Babbitt is used, pressures of about 12,000 lbs. have been satisfactory to seat the ring in the housing. To seat the stud member in the ring pressures of about 3000 lbs. have been found satisfactory. The die pressure will vary materially depending upon the hardness of the metal used and the shape or angle of the inner surface of the ring. In other words, the pressures used depend, first, on the hardness or flowability of the ring metal and, second, on how easy the displacement is made from the metal.

In Figure 6 there is illustrated an assembled view of the completed joint showing the housing 10 in cross-section with the laterally extending threaded shank portion 11 thereof in elevation and inserted into the end of a tie rod 30. A clamp 31 is provided around the tie rod end 30 to secure the shank 11 therein in properly adjusted position. It is understood, of course, that the shank 11 is threaded into the tie rod end 30.

The stud member 25 extends freely through the opening 14 of the housing 10 and the head portion of the stud is in full seated engagement with the soft bearing metal seating member 32 formed from the ring 16. The rounded end 27 of the stud 25 is seated in a spherical depressed portion 33 of a dished retainer member 34 slidable in the housing and urged against the stud end 29 by a compressed helical spring 35 held under compression by a closure plate 36 inserted in the groove 15 of the housing. The plate 36 is held in the groove 15 by peening over the bottom of the housing 10 as shown at 37.

This invention is also applicable to the forming of joints having localized bearing surfaces. Joints of this type are more fully described and claimed in the copending application of George H. Hufferd and Matthew P. Graham, entitled "Joint", U. S. Serial No. 754,424, filed November 23, 1934.

In the forming of these types of joints according to the process of this invention with a soft bearing metal seating member, a joint housing of the type described above is used together with the bearing metal rings illustrated in Figures 2 and 3. However, the bearing metal rings are pressed with a different type of die, more fully illustrated in Figures 7 and 8 and identified by reference numeral 40.

As shown in Figures 7 and 8, the die 40 comprises a cylindrical shank portion 41 adapted to snugly fit and slide along the side walls of the housing 10, a tapered portion 42 having ears or projections 43 and 44 on opposite sides thereof and a disc-like guide portion 45. As best shown in Figure 8, the tapered portion 42 of the die 40 in effect alternates with two oppositely disposed ears 43 and 44 which have cylindrical outer surfaces. The tapered portion 42 forms a taper on the inside face of the bearing ring while the projecting ears 43 and 44 cut the bearing ring to form non-bearing portions which do not contact the stud head as will be hereinafter described. Each ear 43 and 44 extends about one-fourth around the periphery of the tapered surface 42. The shank portion 41 of the die 40 is of larger diameter than the largest diameter of the tapered portion 42 so as to form a shoulder 46 at the junction point between the tapered portion and the shank portion.

As best shown in Figure 7, the die 40 is inserted in the housing 10 with the guide portion 45 extending through the opening in the housing defined by the annular flange 13. The shoulder 46 of the die is forced against the bottom of the bearing ring 16 while the tapered portion 42 of the die expands the ring into tight frictional engagement with the side walls of the housing 10. At the same time the shoulder 46 forces the ring tightly against the flange 13. The ears 43 and 44 of the die force the bearing metal outwardly through the opening defined by the annular flange 13 to form the non-bearing portions 47 and 48 as better illustrated in Figure 9. The tapered portion 42 of the die forms localized bearing portions 49 and 50 on opposite sides of the ring.

With the ring 16 thus seated in the housing 10 as shown in Figure 9, the stud member 25 is forced into the housing in the same manner illustrated in Figure 5 to seat the semi-spherical head portion of the stud in the bearing ring 16 by forcing the tapered portions 49 and 50 of the ring to assume a semi-spherical shape in true bearing fit with the semi-spherical stud head 26.

As shown in Figures 10 and 11, the stud head 26 therefore only bears against the bearing ring 16 on localized bearing surfaces lying on opposite sides of a plane normal to the plane containing the axis of the shank 11. It has been found that these bearing surfaces 49 and 50 are subjected to the most wear because the tilting action of the stud member 25 is mostly in a plane containing the axis of the tie rod or a plane parallel thereto. It follows that most of the wear of the seating member would be localized on opposite sides of a plane normal to the plane containing the shank of the stud. As these surfaces would naturally wear away faster than the bearing surfaces on opposite sides of a plane containing the axis of the shank, it follows that an uneven bearing surface on the seating member would result and the stud head could not be forced into a full seating bearing engagement with the seating member because the unworn portions of the seating member would prevent the stud from being urged into full seating engagement with the worn away portions. Therefore, in order to remedy this, the bearing surfaces lying on opposite sides of a plane containing the axis of the stud are eliminated and the entire tilting and rotating action of the stud is borne by two localized bearing surfaces lying on opposite sides of a plane normal to a plane containing the axis of the shank.

The stud head 26 as shown in Figures 10 and 11 is urged into constant bearing relation with the curved surfaces 49 and 50 of the bearing ring 16 by the helical spring 35 urging the retaining member 34 against the rounded end of the stud 27 in the same manner described in connection with the joint assembly shown in Figure 6.

The joints of the invention therefore comprise housing members having relatively soft bearing metal sleeves pressed therein with bearing surfaces for the stud head formed thereon by pressing the head into seating engagement with the soft bearing metal. It should be understood that any relatively soft workable material can be used for the bearing sleeve. Babbitt metal, Woods metal, and other alloys commonly used in bearing connections are desirable. If desired, these materials can be impregnated with a lubricant such as graphite or the like.

Since the stud member is seated into its bearing member by a pressing operation, no grinding, lapping or other seating operations are necessary, and at the same time a perfect bearing fit for the stud head is provided.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of making joints having a headed stud member freely rotatable and tiltable in a socket member which comprises providing an annular ring of a relatively soft workable metal in the socket member, and pressing the stud head into the ring to form a bearing surface thereon for the stud head.

2. The method of making joints having a headed stud member freely rotatable and tiltable in a socket member which comprises inserting an annular ring of a soft bearing metal into the socket, die pressing the ring to securely seat the same in the housing, inserting the stud member through the seated ring to engage the stud head with the ring and die pressing the stud head in the ring to form its own bearing surface thereon.

3. The method of making joints having a stud member extending from a socket member in freely rotatable and tilting relation thereto, said stud member having a headed portion bearing against a seat element in the stud, which comprises inserting an annular ring of a soft bearing metal into the socket, die pressing the ring to securely seat the same in unitary relation to the housing and die pressing the stud in the seated ring to form a bearing surface thereon for the stud head.

4. A joint comprising a housing, a relatively soft metal ring pressed therein and a stud pressed into the ring to form its own bearing surface thereon.

5. A tie rod joint comprising a housing member having a cylindrical bore extending therethrough and an inturned flange at one end thereof defining a circular opening, an annular ring of soft bearing metal pressed in said bore abutting said flange, a stud extending through said opening in free rotating and tilting relation to the housing, said stud having a semi-spherical end disposed in the housing and pressed into the soft metal ring to form its own bearing surface therein and means for urging the stud head into constant bearing engagement with the ring.

6. A tie rod joint comprising a socket member having a cylindrical bore extending therethrough, an inturned flange at one end thereof defining a circular opening and a laterally extending shank portion formed on the outside thereof, a lubricant impregnated Babbitt metal ring pressed in said bore abutting said flange, a stud member having a shank extending freely through said opening and a semi-spherical head portion pressed into said Babbitt metal ring to form its own bearing surface therein, a rounded end on said stud member below said semi-spherical head portion, a dished retainer member slidable in said bore having a central depression therein for receiving said rounded end, a closure plate fixedly secured in the bottom of said socket and a helical spring compressed between said retainer member and closure plate to urge said retainer member against the rounded end of the stud member and maintain the stud head in constant bearing engagement with the Babbitt metal ring.

7. A tie rod joint comprising a socket member having a bore extending therethrough, an inturned flange at one end thereof defining a restricted opening, a sleeve of soft material pressed in said bore abutting said flange, localized inwardly extending surfaces on opposite sides of said sleeve separated by recessed portions, a stud member having a shank portion extending freely through said restricted opening and a segmental spherical head portion in said socket pressed into said sleeve to form its own bearing surfaces on the localized surfaces thereof in spaced relation from the recessed portions and means urging the stud head into constant bearing relation with said bearing surfaces.

8. A joint having a stud member in universal bearing relation with a socket member comprising a socket having a cylindrical bore extending therethrough and an inturned flange defining a restricted circular opening at one end thereof, a shank portion extending from said socket on one side thereof, a soft bearing metal sleeve pressed into said socket and abutting the flange thereof, said sleeve having separated localized inwardly extending portions on opposite sides thereof, said portions each extending about one fourth the way around the sleeve and lying on opposite sides of a plane normal to a plane containing the axis of the shank portion, said stud having a segmental spherical head pressed into said sleeve to form its own bearing surfaces on the localized inwardly extending portions thereof and means urging said stud head into constant engagement with said surfaces.

9. The method of making tie rod joints having a headed stud member universally mounted in a socket member which comprises inserting a sleeve of soft workable metal into the socket, expanding the sleeve into tight engagement with the socket, pressing metal from the inside surface of the sleeve to form oppositely disposed localized inwardly extending portions thereon separated by recessed portions and pressing the stud head into full seated relation with the inwardly extending portions in spaced relation from the recessed portions.

10. The method of making tie rod joints which comprises providing a housing having a cylindrical bore extending therethrough with an inturned flange at one end thereof, inserting an annular collar into the bore of the housing against the inturned flange, forcing a tapered die through the collar to expand the same into tight engagement with the housing and to provide a frusto-conical inner wall on the collar and pressing the head of a stud member into the frusto-conical wall of the collar for forming its own bearing surface thereon.

11. The method of making tie rod joints having a headed stud member universally mounted in a socket member which comprises inserting an annular collar of soft workable metal into a cylindrical socket and pressing metal from the inside surface of the collar to form oppositely disposed localized inwardly extending portions thereon adapted to form bearing surfaces for the stud head said portions being separated from each other by recesses formed from the pressing operation.

12. A universal joint which comprises a socket having a soft, workable metal bearing wall therein, a stud extending from said socket and having a hard fragmental spherical portion therein pressed into the bearing wall to form its own bearing surface thereon and resilient means urging the stud head into proper bearing relation with said bearing surface.

13. A universal joint which comprises a socket having a soft workable bearing metal wall therein, a stud extending from said socket and having a segmental spherical head portion therein pressed into the bearing wall to form its own bearing surface thereon, a segmental spherical surface on the end of said stud of smaller diameter than the stud head, a retainer member slidable in said socket and having a segmental spherical portion adapted to be seated against the segmental spherical surface on the end of the stud, and spring means for urging said retainer member into bearing engagement with the stud surface for maintaining the stud head in proper bearing relation with the bearing wall of the socket.

14. The method of making joints having a headed stud member extending from a socket member in free rotatable and tiltable relation thereto which comprises providing a socket having a soft workable metal bearing wall therein and pressing the head of a stud member into the wall to form a bearing surface thereon for the stud head.

15. The method of making joints having a headed stud member freely rotatable and tiltable in a socket member which comprises providing a socket having an opening giving entrance thereto and an annular soft workable metal wall therein converging inwardly toward said opening and die pressing a stud head into the wall in the direction of convergence thereof to form a bearing surface thereon for the stud head.

GEORGE H. HUFFERD.